No. 855,093. PATENTED MAY 28, 1907.
F. H. BURMESTER.
CONTROLLER FOR ELECTRIC MOTORS.
APPLICATION FILED FEB. 1, 1905.

3 SHEETS—SHEET 1.

WITNESSES:
W. A. Alexander
Fred Hauke

INVENTOR
F. H. Burmester.
BY
Fowler & Bryson
ATTORNEYS

No. 855,093. PATENTED MAY 28, 1907.
F. H. BURMESTER.
CONTROLLER FOR ELECTRIC MOTORS.
APPLICATION FILED FEB. 1, 1905.

3 SHEETS—SHEET 2.

WITNESSES:
W. A. Alexander
Fred Hauke

INVENTOR
F. H. Burmester.
BY
Fowler & Bryson
ATTORNEYS.

No. 855,093. PATENTED MAY 28, 1907.
F. H. BURMESTER.
CONTROLLER FOR ELECTRIC MOTORS.
APPLICATION FILED FEB. 1, 1905.
3 SHEETS—SHEET 3.
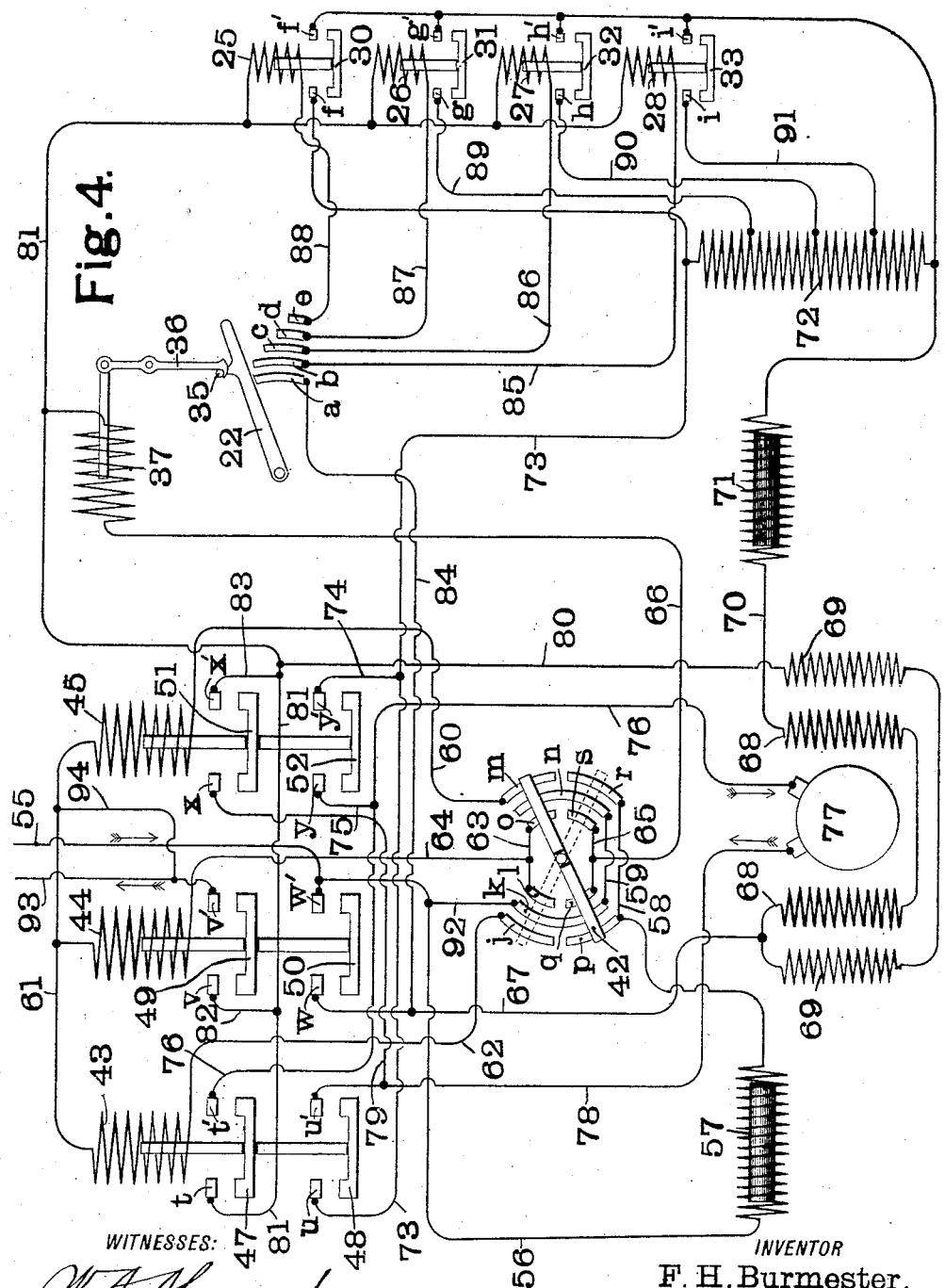
WITNESSES:
W. H. Alexander
Fred Hauke.
INVENTOR
F. H. Burmester.
BY
Howke & Bryson
ATTORNEYS.

UNITED STATES PATENT OFFICE.

FREDRICK H. BURMESTER, OF ST. LOUIS, MISSOURI, ASSIGNOR TO WILLIAM A. MILLER ELEVATOR MANUFACTURING COMPANY, OF ST. LOUIS, MISSOURI, A CORPORATION OF MISSOURI.

CONTROLLER FOR ELECTRIC MOTORS.

No. 855,093.  Specification of Letters Patent.  Patented May 28, 1907.

Application filed February 1, 1905. Serial No. 243,617.

*To all whom it may concern:*

Be it known that I, FREDRICK H. BURMESTER, a citizen of the United States, residing at the city of St. Louis, State of Missouri, have invented a certain new and useful Controller for Electric Motors, of which the following is such a full, clear, and exact description as will enable any one skilled in the art to which it appertains to make and use the same, reference being had to the accompanying drawings, forming part of this specification.

My invention relates to a controller for electric motors and more particularly for motors used in operating elevators.

The object of my invention is to provide means whereby the starting, stopping and reversing of the motor, as well as the cutting in and out of the variable resistance to gradually start the motor, is accomplished by suitable solenoids or electro-magnets, in place of being accomplished directly by the mechanical movement of the switch arms.

Figure 1:
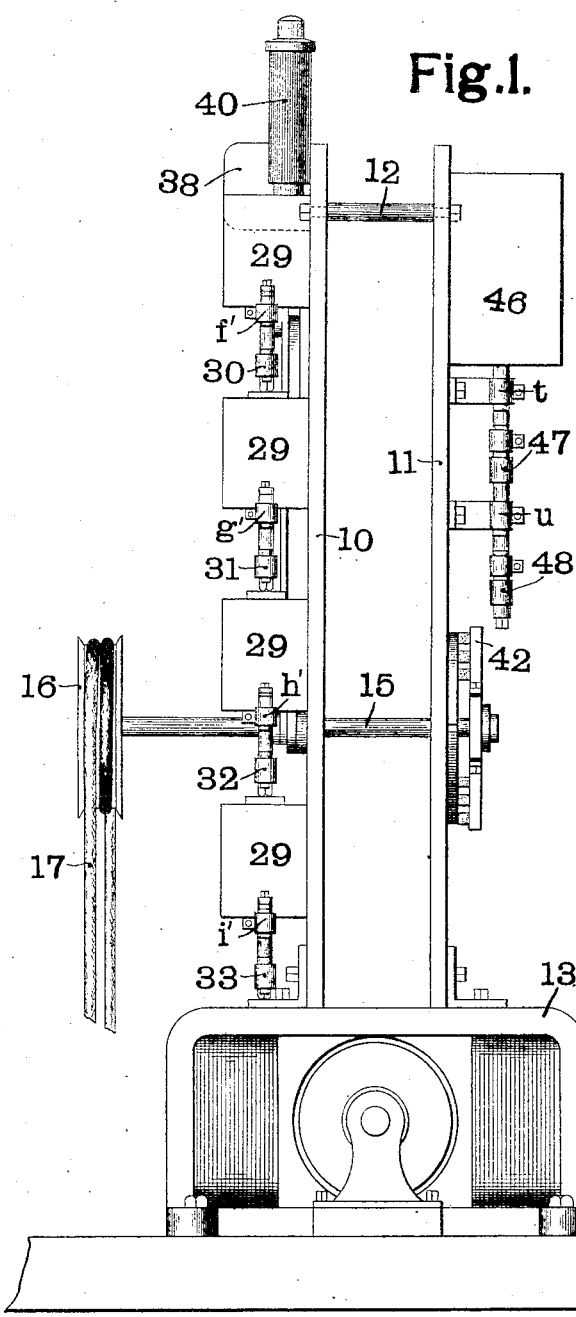
Figure 3:
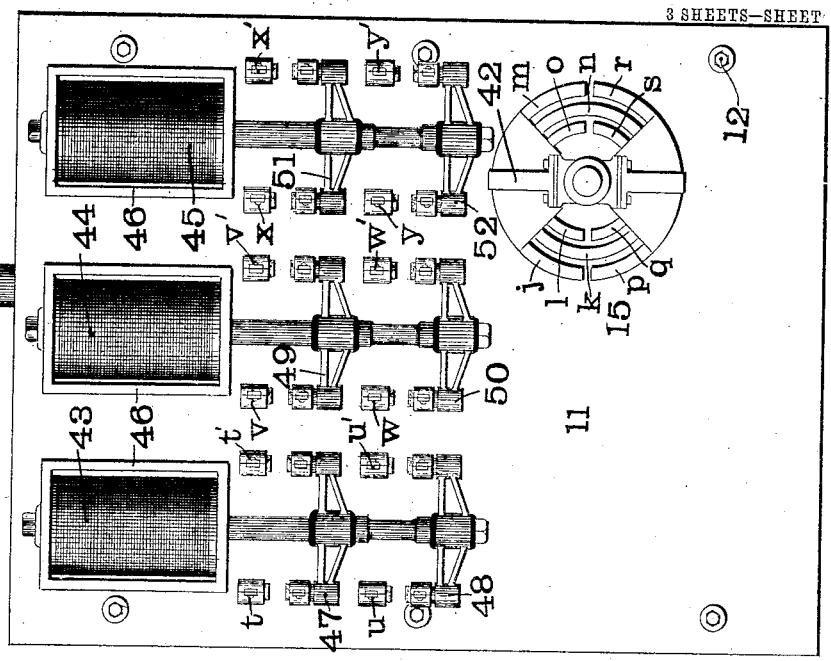
Figure 2:
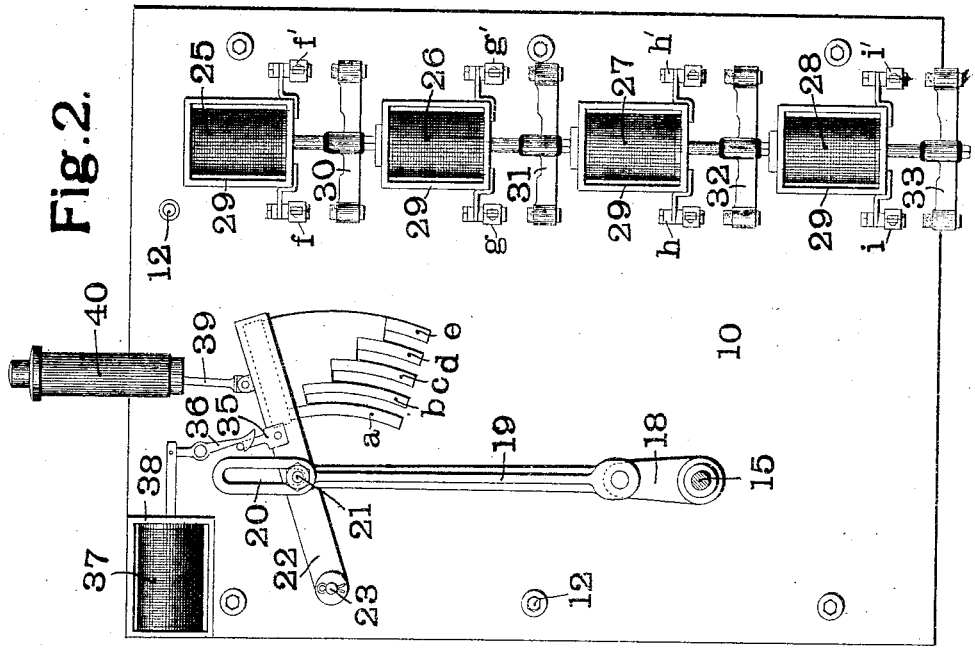

In the accompanying drawings, which illustrate one form of controller made in accordance with my invention, Figure 1 is an end view, Fig. 2 is an elevation of the front panel; Fig. 3 is an elevation of the rear panel, and Fig. 4 is a diagrammatic view.

The front panel 10 and rear panel 11 are made of marble, slate or other non-conducting material and are connected together by means of bolts 12. The panels 10 and 11 are preferably supported on the motor 13, as shown in Fig. 1 of the drawings.

15 is the controller shaft, which passes through both the panel 10 and panel 11. In Fig. 1 of the drawings I have shown the shaft 15 as provided with a pulley 16 over which passes a rope 17, which extends to the elevator car where it may be manually operated. The shaft 15, however, may be operated by any suitable mechanism, either manual or automatic. Secured to the shaft 15 adjacent to the front panel 10 is an arm 18 to which is pivoted one end of a link 19. The opposite end of the link 19 is provided with a slot 20 through which passes a bolt 21 into a contact arm 22 pivoted to the front panel at 23. The contact arm 22 is adapted to connect segmental contacts $a$, $b$, $c$, $d$ and $e$.

These contacts are connected by circuits, as will be hereinafter described, with solenoids 25, 26, 27 and 28. Each of the solenoids 25, 26, 27 and 28 is supported on the front panel 10 by means of a housing 29. Carried by the core of the solenoid 25 is a contact arm 30 and similar contact arms 31, 32 and 33 are carried by the cores of the solenoids 26, 27 and 28 respectively. The contact arms 30, 31, 32 and 33 are made of conducting material and are insulated from the cores carrying the same. The arm 30 is adapted to coöperate with contacts $f$ and $f'$. The arm 31 coöperates with contacts $g$ and $g'$; the arm 32 with contact $h$ and $h'$ and the arm 33 with contacts $i$ and $i'$. The arm 22 is provided with a projection 35 adapted to engage with a pivoted hook 36 which is operated by the core of a solenoid 37. This solenoid 37 is supported on the front panel 10 by means of a housing 38. The arm 22 also has pivoted to it a piston rod 39 working in a dash pot 40, in order to regulate the descent of the arm 22 after it is released by the movement of the hook 36.

The controller shaft 15 has secured to it adjacent to the rear panel 11, a double switch arm 42. This switch arm 42 is adapted to make connection with curved contacts $j$, $k$, $l$, $m$, $n$, $o$, $p$, $q$, $r$ and $s$. Leading from these contacts are various conductors, which will be hereinafter described. These conductors control the operation of the solenoid 37 hereinbefore described, and also control the operation of three solenoids 43, 44 and 45. Each of these solenoids 43, 44 and 45 is supported on the rear panel 11 by means of a housing 46. Carried by the core of the solenoid 43 are two contact arms 47 and 48. The core of the solenoid 44 is provided with similar contact arms 49 and 50 and the core of the solenoid 45 is provided with arms 51 and 52. The arm 47 is adapted to coöperate with contacts $t$ and $t'$; the arm 48 with contacts $u$ and $u'$; the arm 49 with contacts $v$ and $v'$; the arm 50 with contacts $w$ and $w'$; the arm 51 with contacts $x$ and $x'$, and the arm 52 with contacts $y$ and $y'$.

55 is the leading in wire. This wire is connected to contact $w'$. Leading from the wire 55 is a conductor 56 leading to the contact $p$.

Contained in the conductor 56 is the main brake 57. 58 is a conductor connecting the contact $p$ with the contact $r$, and 59 is a conductor connecting the contact $k$ with the contact $n$. Leading from the contact $m$ to the solenoid 45 is a conductor 60. Leading from the solenoid 45 to the solenoid 43 is a conductor 61. This conductor 61 is also connected with the end of the solenoid 44. Leading from the solenoid 43 to the contact $j$ is a conductor 62. Connecting the contact $o$ with the contact $l$ is a conductor 63, and leading from this conductor 63 is a conductor 64, which is attached to one end of the solenoid 44. Connecting the contacts $q$ and $s$ is a conductor 65, and leading from this conductor 65 is a conductor 66 attached to one end of the solenoid 37. Leading from the contact $w$ is a conductor 67, which is connected to the two windings 68 and 69 of the field of the motor 13. Leading from the winding 68 is a conductor 70, which terminates at the contact $f'$ and is also connected to the contacts $g'$, $h'$ and $i'$. Contained in this conductor 70 is the race brake 71. This race brake 71, like the main brake 57 hereinbefore mentioned, is old in the art and is not essential to my invention, consequently neither of these brakes are shown or described in detail. Connected to the conductor 70 is one end of a variable resistance 72. The opposite end of the resistance 72 is connected to a conductor 73 leading from the contact $f$ to the contact $u$. This conductor 73 is also connected by means of a conductor 74 with the contact $y'$. Leading from the contact $y$ is a conductor 75, which is connected with a conductor 76 leading from the contact $t'$ to one brush of the armature 77 of the motor 13. Leading from the other brush of the said armature to the contact $u'$ is a conductor 78. Leading from the conductor 78 to the contact $x$ is a conductor 79. Leading from the field winding 69 is a conductor 80. This conductor 80 is connected to a conductor 81 extending from the contact $t$ to one end of the solenoid 28. This conductor is also connected to one end of each of the solenoids 25, 26 and 27, and also to one end of the solenoid 37. Leading from the conductor 81 to the contact $v$ is a conductor 82, and from the said conductor 81 to the contact $x'$ is a conductor 83. Leading from the conductor 67 to the contact $a$ is a conductor 84. Leading from the conductor $b$ to one end of the solenoid 28 is a conductor 85. Leading from one end of the contact $c$ to the solenoid 27 is a conductor 86. Leading from the contact $d$ to the solenoid 26 is a conductor 87, and leading from the contact $e$ to the solenoid 25 is a conductor 88. The contact $g$ is connected with a point in the variable resistance 72 by means of a conductor 89. The contact $h$ is connected with another point in said resistance by means of a conductor 90, and the contact $i$ is connected with still another point in said resistance by means of a conductor 91.

92 is a conductor connecting the conductor 56 with the contact $k$, and 93 is the leading-out wire which extends from the contact $v'$. This leading-out wire 93 is connected with the conductor 61 by means of a conductor 94.

The operation of my controller is as follows: When the switch arm 42 is in the position shown in Fig. 3 of the drawings the contact arm 22 will be held in its raised position, as shown in Fig. 2, and the hook 36 will be in engagement with the projection 35 so as to retain the arm in this position even after the link 19 has been drawn downward by the movement of the controller shaft 15. This movement of the link 19, independent of the arm 22, is permitted by means of the slot 20. When the arm 42 is in its vertical position, as above described, the motor will be cut out of operation. If the arm is moved in the position shown in full lines in Fig. 4, the motor will operate in one direction, while if the arm is moved in the position shown in dotted lines in said figure, the motor will run in the opposite direction. Supposing first that the arm is moved in the position shown in full lines in Fig. 1, current will enter the controller through the leading-in wire 55, and will thence pass down through the conductor 56 and the arm 42 to the contact $k$. The current will then pass from the contact $k$ to the contact $n$ through the conductor 59. From the contact $n$ the current will pass to the contact $m$ through the arm 42, and from the contact $m$ through the conductor 60 to and through the solenoid 45, and thence by means of the conductors 61 and 94 to the leading-out wire 93. The solenoid 45 will thus be actuated to raise its core and thus bring the arm 51 into position to connect the contacts $x$ and $x'$ and the arm 52 into position to connect the contacts $y$ and $y'$. At the same time a portion of the current, in place of passing from the contact $n$ to the contact $m$, will pass from the contact $n$ to the contact $o$ through the arm 42. This portion of the current will then pass by means of the conductors 63 and 64 to the solenoid 44 and from the solenoid 44 through the conductors 61 and 94 to the leading-out wire 93. The solenoid 44 will thus also be actuated to raise its core and connect the contacts $v$ and $v'$ and the contacts $w$ and $w'$. As the contacts $v$ and $v'$ are now connected a portion of the current will pass from the contact $k$ through the arm 42 to the contact $q$ and thence through the conductors 65 and 66 to the solenoid 37. From the solenoid 37 the current will pass through the conductors 81 and 82 to the contact $v$ and thence through the arm 49 to the contact $v'$ and thence out through the leading-out wire 93. The solenoid 37 will thus be actuated to disengage the hook 35 from the arm 22 so as to allow the said arm to drop by its gravity and thus connect the contact $a$ successively with the contacts $b$, $c$, $d$ and $e$. As the contacts $w$ and $w'$ are connected by means of the arm 50 a portion of the current from the leading-in wire 55 will pass from the said contact $w'$ through the arm 50 to the contact $w$. The current will thence pass down through the conductor 67 to the windings 68 and 69 of the motor field. A portion of this current will pass through the winding 68 and a portion through the winding 69. The portion which passes through the winding 68 will pass along the conductor 70 to the variable resistance 72. Inasmuch as none of the solenoids 25, 26, 27 and 28 have yet been actuated, the current cannot pass farther along the conductor 70 than to the resistance 72. It will thus be necessary for the current to pass up through the entire resistance 72 and thence through the conductors 73 and 74 to the contact $y'$. As the contact $y'$ is connected by means of the arm 52 with the contact $y$, the current will then pass down through the conductors 75 and 76 to one brush of the armature, so that the current will pass through the armature in the direction indicated by the arrows in the drawing. The current will then pass from the armature through the conductors 78 and 79 to the contact $x$, from whence it will pass to the leading-out wire 93, as has been hereinbefore described, namely, through the arm 51, conductors 83, 81 and 82 and arm 49 to the leading-out wire 93. The portion of the current which passes through the winding 69 will pass up through the conductor 80 to the conductor 81 and thence to the leading-out wire 93 through the conductor 82 and arm 49. In the circuits above described the current through the winding 68 of the motor field must pass through the entire variable resistance 72. When, however, the arm 22 has been released, as above described, it will descend and first connect the contact $a$ with the contact $b$. As soon as this takes place current will pass from the conductor 67 along the conductor 84 to the contact $a$ and thence through the arm 22 to the contact $b$. From the contact $b$ it will pass down through the conductor 85 and thence through the solenoid 28 to the conductor 81, which, as has been above pointed out, is now in connection with the leading-out wire. The solenoid 28 will thus be actuated to raise its core and connect the contacts $i$ and $i'$ by means of the arm 33. The current will now, in place of passing through the lower part of the variable resistance 72, pass from the conductor 70 to the contact $i'$ and thence through the arm 33, contact $l$ and conductor 91 to the resistance 72, thus short-circuiting a portion of the resistance. As the arm 22 continues to descend the solenoids 27, 26 and 25 are successively operated, thus short-circuiting successive portions of the resistance 72, as will be readily apparent, until, when the solenoid 25 is actuated, the entire resistance will be short-circuited and the current will pass directly from the conductor 70 to the conductor 73.

When the arm 42 is moved into the position shown in dotted lines in Fig. 4, the operation will be the same except that the solenoid 45 will not be actuated as the contact $m$ is not connected with the contact $n$ when the arm is in this position and the solenoid 43 will be actuated as the contact $k$ is connected with the contact $j$ in this position, and consequently the current will pass from the conductor 92 through the contact $k$, arm 42 and contact $j$ to the conductor 62, from whence it will pass through the solenoid 43 and through the conductors 61 and 94 to the leading-out wire 93. Therefore, in this position the solenoid 44 is actuated the same as when the arm is in the position shown in full lines, but the solenoid 43 is actuated in place of the solenoid 45. Consequently, when the current passes from the variable resistance 72 through the conductor 73, it cannot pass from the contact $y'$ to the contact $y$ as the solenoid 45 is not actuated, but it will pass from the conductor 73 through the contact $u$, arm 48 and contact $u'$ to the conductor 78 and will thus pass through the armature 77 in the opposite direction to that above described, so that the motion of the motor is reversed. In this position of the arm the current passes from the armature along the conductor 76 to the contact $d'$ and thence through the arm 47, contact $v$ and conductors 81 and 82 to the contact $v$, and thence through the arm 49 and contact $v'$ to the leading out wire 93.

Having fully described my invention, what I claim as new and desire to secure by Letters Patent of the United States, is—

1. In a controller for electric motors, the combination with a motor, of a controller shaft, means for operating said shaft, a switch arm operated by said shaft, solenoids controlled by said switch arm, and reversing means for the motor controlled by said solenoids.

2. In a controller for electric motors, the combination with a motor, of a controller shaft, means for operating said shaft, a switch arm operated by said shaft, solenoids controlled by said switch arm, reversing means for the motor controlled by said switch arm, a contact arm controlled by said switch arm, solenoids controlled by said contact arm, and a variable resistance in circuit with said motor and controlled by said latter named solenoids.

3. In a controller for electric motors, the combination with a motor provided with an armature and field windings, of a solenoid controlling the connections to the field of said motor, two solenoids controlling the connections to the armature of said motor, and means for energizing said first named solenoid and either of said second named solenoids.

In testimony whereof, I have hereunto set my hand and affixed my seal in the presence of the two subscribing witnesses.

FREDRICK H. BURMESTER. [L. S.]

Witnesses:
W. A. ALEXANDER,
BENNETTE PIKE.